United States Patent
Naden et al.

(10) Patent No.: US 6,560,206 B1
(45) Date of Patent: May 6, 2003

(54) CELL BASED DATA TRANSMISSION METHOD

(75) Inventors: James M Naden, Hertford (GB); Mark W Tait, Hertford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/337,069

(22) Filed: Jun. 21, 1999

(51) Int. Cl.[7] .................................................. H04J 3/00
(52) U.S. Cl. ................. 370/310.1; 370/333; 370/395.1; 714/746
(58) Field of Search ................................. 370/474, 365, 370/366, 395.1, 476, 389–418, 310, 310.1, 310.2, 521, 332, 333, 328, 338, 349; 714/701, 746–752

(56) References Cited

U.S. PATENT DOCUMENTS

| | | | |
|---|---|---|---|
| 5,568,482 A | | 10/1996 | Li et al. |
| 5,757,771 A | * | 5/1998 | Li et al. ........................ 370/235 |
| 6,072,773 A | * | 6/2000 | Fichou et al. ................. 370/230 |
| 6,230,297 B1 | * | 5/2001 | Bentall et al. ............... 714/758 |
| 6,269,096 B1 | * | 7/2001 | Hann et al. .................. 370/366 |
| 6,411,629 B1 | * | 6/2002 | Bentall et al. ............... 370/458 |

OTHER PUBLICATIONS

U.S. patent application Ser. No. 09/222,557, Bentall et al., filed Dec. 29, 1998.

IEEE Journal on Selected Areas in Communications, vol. 15, No. 1, Jan. 1997, "A Recommended Error Control Architecture for ATM Networks with Wireless Links" J Bibb Cain, Dennis N McGregor.

* cited by examiner

Primary Examiner—Ajit Patel
Assistant Examiner—Raj Jain
(74) Attorney, Agent, or Firm—Barnes & Thornburg

(57) ABSTRACT

The present invention seeks to provide a more reliable method for transmitting data packets over a communications link, such as a wireless link. A method of error correction for a cell based transmission protocol is provided wherein the cells are arranged to form multi-cell frames wherein for each frame the header fields are reduced in size and; wherein idle cells provide space for error correction within the payload of the multi-cell frame. Preferably, an algorithm is provided which is operable to evenly distribute these idle cells in time. The separate coding of the headers and payloads can enable at least some payload errors to be removed by reference to the header field. Where idle cells are present in the frame, the presence of ATM idle cell headers in the header field of the frame is used to enhance the effectiveness of the coding applied to the payload field. The present invention can provide a radio link protocol that affords robust communications between a headend and a plurality of mobile substations in a standardised data communications format, such as the ATM data format

45 Claims, 9 Drawing Sheets

- 271.5 byte frame size
  - 1ms at 2Mb/s
- Byte-interleaved header field
- Header and payload fields independently coded

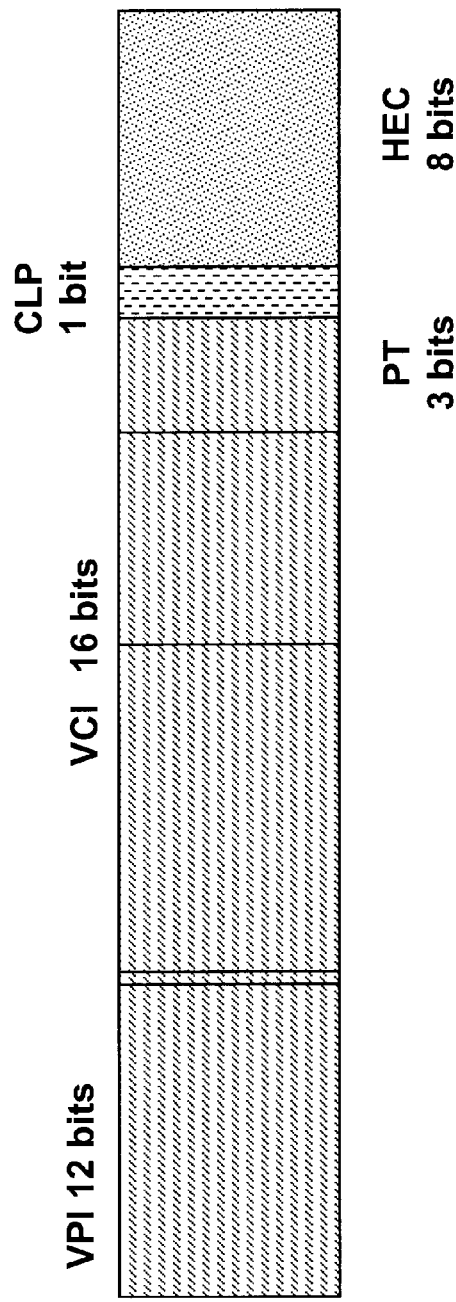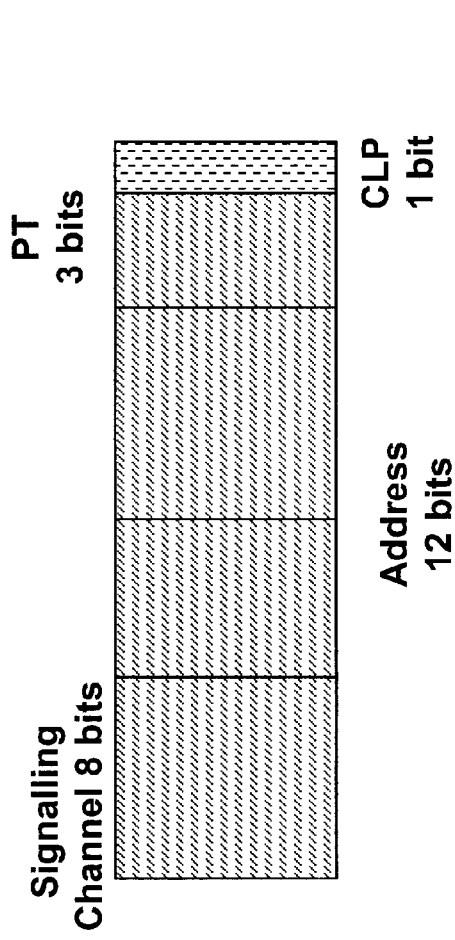
Figure 1
Figure 2

CELL BASED DATA TRANSMISSION METHOD

TECHNICAL FIELD

This invention relates to methods of transmitting data over a communications link and to cell-based methods of transmitting data over a communications link and to corresponding systems, apparatus and software for transmitting or receiving data and in particular to transmitting such data over a communications link which is subject to a high error rate, such as a wireless link.

BACKGROUND OF THE INVENTION

Cell-based protocols for transmission systems are well known. Cells (also called packets) are sent individually, and routed over a network using addressing information in the cell. Usually the data needs to be fitted into a number of such cells. Some protocols specify variable length cells, for example IP, and others specify cells of fixed length, such as ATM. Some are connection oriented, such as SNA, ATM, X.25 and frame relay. Others are connectionless, for example IP.

One known cell-based protocol, the Asynchronous Transfer Mode (ATM) protocol, will now be discussed in more detail. The ATM protocol is designed for data transfer over high speed, low error rate digital networks for multiple service types. ATM has generally been considered unsuitable for wireless transmission due to its low tolerance to errors.

ATM Adaptation Layers (AALs) shape the service data for the ATM protocol and provide error protection characteristics dictated by the properties of the transmission medium and the service. There are currently a number of different AALs specified, each with different error handling features. For example AAL 5 includes error detection information, though not correction information, at the frame level, but none is provided at the cell level, at least for the cell payload. This error protection is achieved by concatenating each data unit with a header and trailer, resulting in a variable length frame structure. The frame is then segmented into cells for transmission by the ATM protocol.

ATM is a transmission protocol based upon asynchronous time division multiplexing using fixed length data packets or cells. These cells typically have a length of 53 bytes: each cell containing 48 octets of user data (payload) and 5 octets of network information (header). Cells of a length of 55 bytes are also known, but in less frequent use. The ATM protocol segments data into cells. The header of a cell contains limited header error correction information. The header of a cell also contains address information which allows the network to route the cell. The address information is made from a concatenation of the Virtual Path Identifier and the Virtual Channel Identifier. These two fields require 28 bits (3.5 octets) of information. FIG. 1 shows an example of an ATM cell header.

ATM communications technology will have an important part to play in the evolution of global communications networks, especially the internet. Considering trunk communication, each trunk link will be used to carry several different types of traffic, the two most common traffic types being generally known as voice and data. Voice traffic can contain errors and still be understood to a reasonable quality due to the brain's ability to cope with noise. The key criterion of voice is that it cannot withstand large variations in delay. Data traffic, such as a file transfer, can tolerate extreme delays but cannot tolerate lost or corrupt information. In general these two different types of traffic have been carried by different networks operating significanty different protocols. More recently Asynchronous Transfer Mode (ATM) has provided a common network protocol for these two traffic types.

One characteristic of ATM is the provision of an idle cell. Some data sources exhibit a variable bit rate and in order to support the transmission data from such sources it is sometimes necessary, when the bit rate decreases, to transmit empty cells, referred to as idle cells. This enables ATM to transport traffic with a wide range of characteristics.

ATM has been designed to operate over low error-rate trunk networks, which generally use reliable optical communication techniques, and assumes that the data traffic suffers a low error rate. The international Telecommunications Union (ITU) has recommended that erroneous frames be recovered by retransmissions of the entire frame in preference to individual cell retransmissions. Assured services carry significant disadvantages because of the retransmission system, including prolonged buffering at the transmitter, prolonged buffering at the receiver, complex protocol acknowledgement structures, and increased latency from acknowledgement messages and data retransmission.

Wireless communication is becoming one of the most popular commercial methods for providing access and trunk communications. With the recent launch of Low Earth Orbit (LEO) satellites, there are now many applications within commercial and military environments that may use terrestrial or satellite-based wireless communication links. The problem with wireless communication is that the fundamental error rates are significantly greater than those experienced in wireline systems. Wireless systems must cope with a harsher signal propagation environment that is subject to noise, interference, fading and delay. This is further compounded by the restrictions on the power levels at which wireless systems can operate. Mobile handsets and orbiting satellites are restricted in their transmit power by battery life, and wireless systems are generally constrained by regulatory limits on transmit power.

Wireless communication suffers errors within the traffic and the distribution of errors is uneven. The error rate has an underlying random independent bit error rate, overlaid by a burst error rate. Whilst ATM has therefore generally been considered unsuitable for wireless transmission, some attempts have been made to adapt ATM for transmission over wireless systems.

U.S. Pat. No. 5,568,482 (Li et al., assigned to Yurie Systems Inc.) describes a low speed radio link system for ATM transport. An incoming stream of ATM cells intended for transmission over the radio link is segmented into a plurality of subframes, each subframe carrying a plurality of ATM cells and having additional framing bytes. One example uses nine subframes, each carrying five ATM cells. The structure of this protocol allows synchronisation to be more easily maintained under burst error conditions on the link.

U.S. Pat. Ser. No. 09/222,557 (Bentall, assigned to Nortel Networks Corporation) describes a technique for improving ATM operation over a communications link whereby bandwidth is improved on a communications link by sending a header that supports fewer addresses. An 8 bit address field permits 256 different addresses. This header is associated at both ends of the link such that the original header can be removed, the packet is associated with one of the 256 available channels, and the original header is reconstructed at the far end. By doing this some bandwidth is gained which can be used to improve the quality of the link.

Radio channels such as those found in access networks and radio links typically exhibit bit-error rates (BER) of $10^{-3}$ to $10^{-5}$. These error rates are too high for ATM transmission.

The solutions available in the open literature typically rely on a combination of forward error correction (FEC) and backward error correction (BEC or ARQ). This results in excessive cell delay variation. Furthermore, they often allow an increase in transmitted bit-rate, which restricts the choice of switch/radio combination, as the link-enhancing device is no longer transparent in this sense. It is believed that this occurs in several link accelerators for satellite radio links. However, as ATM has been proposed for the next generation of military communications, some form of link hardening is seen as essential in military radio links for both terrestrial and satellite applications.

OBJECT OF THE INVENTION

The present invention seeks to provide a more reliable method for transmitting data packets over a communications link such as a wireless link. The present invention further seeks to provide a means of improving the BER of a radio link so that it is low enough to meet the requirements of the ATM protocol and in particular the Cell Loss Ratio (CLR) and the Cell Error Ratio (CER) without the introduction of excessive Cell Delay Variation (CDV)

The present invention further seeks to provide a radio link protocol that affords robust communications between a headend and a plurality of mobile or fixed substations in a standardised data communications format, such as the ATM data format. The present invention also seeks to provide a radio link protocol for transferring ATM cells that has improved framing information to maintain link synchronisation under high error and burst error conditions.

SUMMARY OF THE INVENTION

According to a first aspect of the invention, there is provided a method of providing error correction for a cell based transmission protocol; wherein the cells are arranged to form multi-cell frames; wherein the header field of the multi-cell frame comprises all the headers of the cells within the multi cell frame and wherein the payload field of the multi-cell frame comprises all the payloads of the cells within the multi-cell frame; wherein the header field of the multi-cell frame and payload field of the multi-cell frame are coded separately, and; wherein idle cells within the payload of the multi-cell frame provide space for error correction of the payload field.

Preferably the header field of each cell is reduced in size. The header field can be used to optimise payload coding. For a plurality of multi-cell frames, the idle cells can be evenly distributed across said plurality of multi-cell frames. The cell-based protocol can be the ATM protocol.

For a plurality of multi-cell frames, the number of idle cells can be allocated according to the steps;
  i) determining the number (N) of multi-cell frames;
  ii) determining the number (N) of idle cells within said N multi-cell frames, and:
  iii) allocating the first N idle cells to the N multi-cell frames such that each frame contains an idle cell, The link can be a satellite link or a terrestrial link Preferably, for a plurality of multi-cell frames, the idle cells are evenly distributed across said plurality of multi-cell frames and wherein buffers are employed to evenly distribute the idle cells. The buffers can comprise a preceding buffer and an active buffer to evenly distribute the idle cells. The number of traffic cells to output in each frame is governed by a set of rules depending on the number of traffic cells in both the active and preceding buffers. The number of traffic cells to output in each frame is governed by a set of rules depending on the number of traffic cells in both the active and preceding buffers, which rules are set to limit the maximum cell delay variation possible to that set in the cell based protocol standards.

Preferably, the number of traffic cells to output in each frame is governed by a set of rules depending on the number of traffic cells in both the active and preceding buffers, which rules are set to limit the maximum cell delay variation possible to that set in the cell based protocol standards according to the following table:

| Traffic cells in preceding buffer | Traffic cells in active Buffer | Traffic Cells in output frame |
|---|---|---|
| >3 | 15 | 5 |
|  | <5 | O/p all traffic cells in active buffer |
|  | 5–14 | 4 |
| <4 | <8 | Nearest integer value of (#traffic cells in active buffer *0.6) |
|  | >7 | 4 |

Preferably, an algorithm is provided which is operable to evenly distribute these idle cells amongst the frames. The separate coding of the headers and payloads can enable at least some payload errors to be removed by reference to the header field. Where idle cells are present in the frame, the presence of an idle cell headers in the header field of the frame is used to enhance the effectiveness of the coding applied to the payload field.

Previously attempts have been made to eliminate the presence of idle cells in order to allow more bandwidth to be allocated for error correction coding. Difficulties arise in the provision of coding for a channel having a variable bandwidth. Further, the transmission of idle cells has been viewed as an ineffective use of bandwidth, although the primary use of idle cells is to allow the transmission protocol flexibility in varying rates of data flow.

In accordance with a second aspect of the invention, there is provided a method of transmitting data in accordance with a cell-based protocol, the method comprising the following steps:
  arranging the data cells into multi-cell frames;
  reducing the header size;
  separately coding the cell headers and payloads;
  providing a synchronisation word;
  wherein the coding of the headers and payloads is selected from a pre-determined coding-set according to traffic load and communications channel conditions.

The invention accordingly provides a method of improving the resilience of the cell-based protocol to radio link errors. The invention can also improve the performance of a radio link so that it can support the cell-based protocol. This is achieved by combining cell-based protocol cells into a frame to which is added forward error correction (FEC) coding and a synchronisation word. The method exploits the variability in the cell-based protocol traffic rate and redundancy in the cell-based protocol itself to provide bandwidth for the FEC coding so that no increase in overall bit rate is required.

The present invention thus avoids the use of backward error correction (BEC) techniques such as automatic repeat request (ARQ)—and without expansion of the transmitted bit-rate. For example, in ATM, the avoidance of the use of ARQ is essential if the ATM standard for cell delay variation (CDV) is to be met. Maintaining a constant bit-rate is essential if the link-enhancing device, incorporating the invention, is to be inserted transparently between the switch and the radio.

A synchronisation word is added to the frame to provide frame synchronisation. After reception by the receiving radio, which is assumed to achieve bit synchronisation; frame synchronisation is achieved using the synchronisation word. The synchronisation algorithm is readily derived from information contained in the open literature and is based on examination of several (typically six) synchronisation words simultaneously. The use of a small synchronisation word in this way improves the performance in high error rate environments.

The algorithm re-distributes idle cells to optimise the coding strength. This enables the system to adapt to traffic load. In order to smooth the variation in rate at which traffic cells arrive, a procedure controlled by the algorithm is provided whereby the efficiency of the FEC coding is improved. An example of such a mechanism would have a buffer, referred hereafter as the active buffer, containing 3 frames (each frame consisting of 5 cell-based protocol traffic cells). Another buffer preceding the active buffer would contain the next frame in the sequence to those in the active buffer, this frame is used to give an indication of the incoming traffic rate. From the number of traffic and idle cells present in the active buffer, and the number in the preceding buffer, cells can be chosen to make up an output frame with the optimum distribution of traffic and idle cells for the FEC requirements and the traffic loading present. The number of traffic cells to output in each frame is governed by a set of rules depending on the number of traffic cells in both the active and preceding buffers. These rules are set to limit the maximum cell delay variation possible to that set in the cell based protocol standards. An example of these rules is

| Traffic cells in preceding buffer | Traffic cells in active Buffer | Traffic cells in output frame |
|---|---|---|
| >3 | 15 | 5 |
|  | <5 | O/p all traffic cells in active buffer |
|  | 5–14 | 4 |
| <4 | <8 | Nearest integer value of (#traffic cells in active buffer *0.6) |
|  | >7 | 4 |

In summary, the invention provides a method wherein the header fields of the cells are compressed in order to incorporate error correction coding for the headers and makes use of idle cells to provide space for error correction for the payloads of the cells, an algorithm is provided which seeks to evenly distribute these idle cells amongst the frames and the separate coding of the headers and payloads enables some payload errors to be removed by reference to the header field, thus increasing the effectiveness of the payload coding. The system is appropriate for cell-based protocols such as the ATM protocol.

In accordance with a further aspect of the invention, there is provided a system for transmitting data across a link in accordance with a cell based protocol and comprising a link enhancer, the link enhancer being positioned for transmission between a cell based protocol switch and a channel modulator, and, for reception, between a channel modulator a cell-based protocol switch, the link enhancer being operable to:

i) arrange cells into multi-cell frames;
ii) arrange the header field of each multi-cell frame such that it comprises all the headers of the cells within the multi-cell frame and arrange the payload field of each multi-cell frame such that it comprises all the payloads of the cells within the multi-cell frame;
iii) code separately the header field of the multi-cell frame and payload field of the multi-cell frame, and;
iv) provide space for error correction in idle cells, whereby to optimise code performance using the idle cells.

In accordance with another aspect of the invention, there is provided an apparatus for transmitting data across a link in accordance with a call based protocol and comprising a link enhancer, the link enhancer being positioned for transmission between a cell based protocol switch and a channel modulator; and, for reception, between a channel modulator a cell-based protocol switch, the link enhancer being operable to:

i) arrange cells into multi-cell frames;
ii) arrange the header field of each multi-cell frame such that it comprises all the headers of the cells within the multi-cell frame and arrange the payload field of each multi-cell frame such that it comprises all the payloads of the cells within the multi-cell frame;
iii) code separately the header field of the multi-cell frame and payload field of the multi-cell frame, and;
iv) provide space for error correction in idle cells, whereby to optimise code performance using the idle cells.

In accordance with a still further aspect of the invention, there is provided an apparatus for a receiver for receiving across a link in accordance with a cell based protocol and comprising a link enhancer, the link enhancer being positioned for transmission between a cell based protocol switch and a channel modulator; and, for reception, between a channel modulator a cell-based protocol switch, the link enhancer being operable to:

i) receive multi-cell frames;
ii) arrange the header field of each multi-cell frame such that it comprises all the headers of the cells within the multi-cell frame and arrange the payload field of each multi-cell frame such that it comprises all the payloads of the cells within the multi-cell frame,
iii) decode separately the header field of the multi-cell frame and payload field of the multi-cell frame, and;
iv) analyse the received data for errors using error correction data encoded within idle cells, and;
v) convert the signals to a cell based protocol, the error correction coding allowing reduced errors whereby to optimise code performance using the idle cells.

For a plurality of multi-cell frames, the number of idle cells can be averaged. The cell-based protocol can be the ATM protocol. Preferably the number of traffic calls to output in each frame is governed by a set of rules depending on the number of traffic cells in both the active and preceding buffers, which rules are set to limit the maximum cell delay variation possible to that set in the cell based protocol standards.

BRIEF DESCRIPTION OF DRAWINGS

In order that the present invention can be more fully understood and to show how the same may be carried into effect, reference shall now be made, by way of example only, to the Figures as shown in the accompanying drawing sheets wherein:

FIG. 1 shows the arrangement of an ATM cell header;

FIG. 2 shows the arrangement of a header in accordance with the invention;

DETAILED DESCRIPTION OF THE PREFERRED EMBODIMENTS

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

FIG. 2 comprises the compressed header of the ATM protocol as an example of a cell based protocol. The header of ATM cells are compressed by reducing the address space and removing the HEC field. Header compression can be employed to conserve bandwidth. In this case we reduce the address space from 28 bits to 12 bits and remove the HEC field. In order to reconstruct the full address space at the receiver, we must also send mapping information that relates each shortened address to the corresponding full address; this is the purpose of the signalling channel field in the compressed header.

The minimum size of the address field in the compressed header is determined by the cell misinsertion rate defined in the ATM standards. Above this size there is a trade-off between the size of the address field and the size of the signalling channel. A larger address field is more appropriate if many simultaneous calls are in progress whereas a larger signalling channel is more useful if calls are typically of short duration. Our selection represents one particular compromise.

The header field of the frame consists of 5 shortened or compressed headers totalling 15 bytes together with 16 bytes of parity bits from the error correction coding. For a Reed-Solomon block code with a 31 byte field and 16 bytes of parity bits, which is the preferred code, we can correct up to 8 symbols (i.e. bytes) at the decoder.

Other codes may be employed to provide the forward error correction capability and the degree of protection may be varied by choosing codes with more or less error protection. Thus the overall size of the header field and the degree of protection may be adjusted to match the specific channel conditions that are expected to be encountered.

Figure 3:
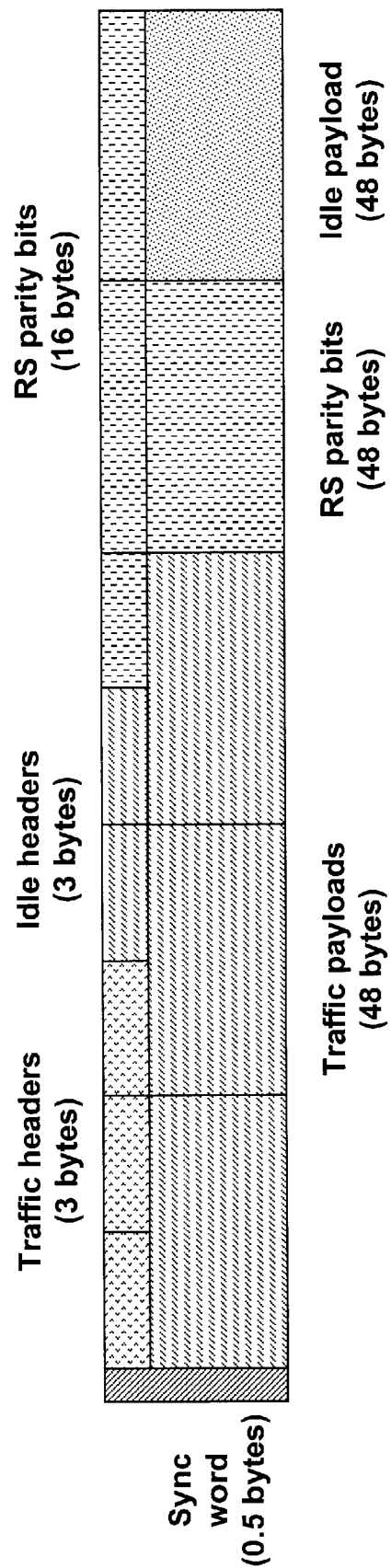
FIG. 3 shows a frame structure comprising 5 cells in accordance with an embodiment of the invention.

With reference to FIG. 3, the ATM cells, typically received from an ATM switch, are grouped into multi-cell frames. Frames of typically five cells are considered as being a reasonable compromise between length and processing complexity: smaller frames reduce the effectiveness of the error correcting codes used to protect them, whilst larger frames result in longer delays and more complex processing to implement the coding.

The payload field consists of 5 ATM cell payloads, each of 48 bytes, making 240 bytes in total. If one or more idle cells are present in the frame, then forward error correction coding is employed on the payload field as a whole. The field is coded as a single block using a Reed-Solomon code. The block length is padded to 255 bytes in order to perform the coding operation, as Reed-Solomon block codes are only available for blocks of specific lengths, and 48 bytes of parity bits are added in place of one of the idle cells. The code must be systematic i.e. the bits remain unchanged after coding. As is well known, the padding bits are removed as the last stage of coding and are reapplied as the first stage of decoding. The level of coding is determined by the available idle cell payload size but it may be envisaged that codes other than Reed-Solomon may be used if channel conditions so warrant.

Any idle cells present are re-distributed across several frames in order to even out their distribution with the aim of providing at least one idle cell per frame. The re-distribution algorithm is bounded by the limits of cell delay variation (CDV) defined in the ATM standards.

If an idle cell is present in the frame, the payloads of the (typically five) ATM cells in the frame, less the idle cell, are coded using a block code, such as a Reed Solomon code, and the parity bits of the code are inserted in the payload of the idle cell to form the combined payload field. If no idle cell is present in the frame, no coding is performed. If more than one idle cell is present in the frame, only one of the idle cells is used to carry the parity bis of the code. This code must be systematic: that is to say, parity bits are added but no changes are made to the original bits in the respective payloads.

Figure 4:
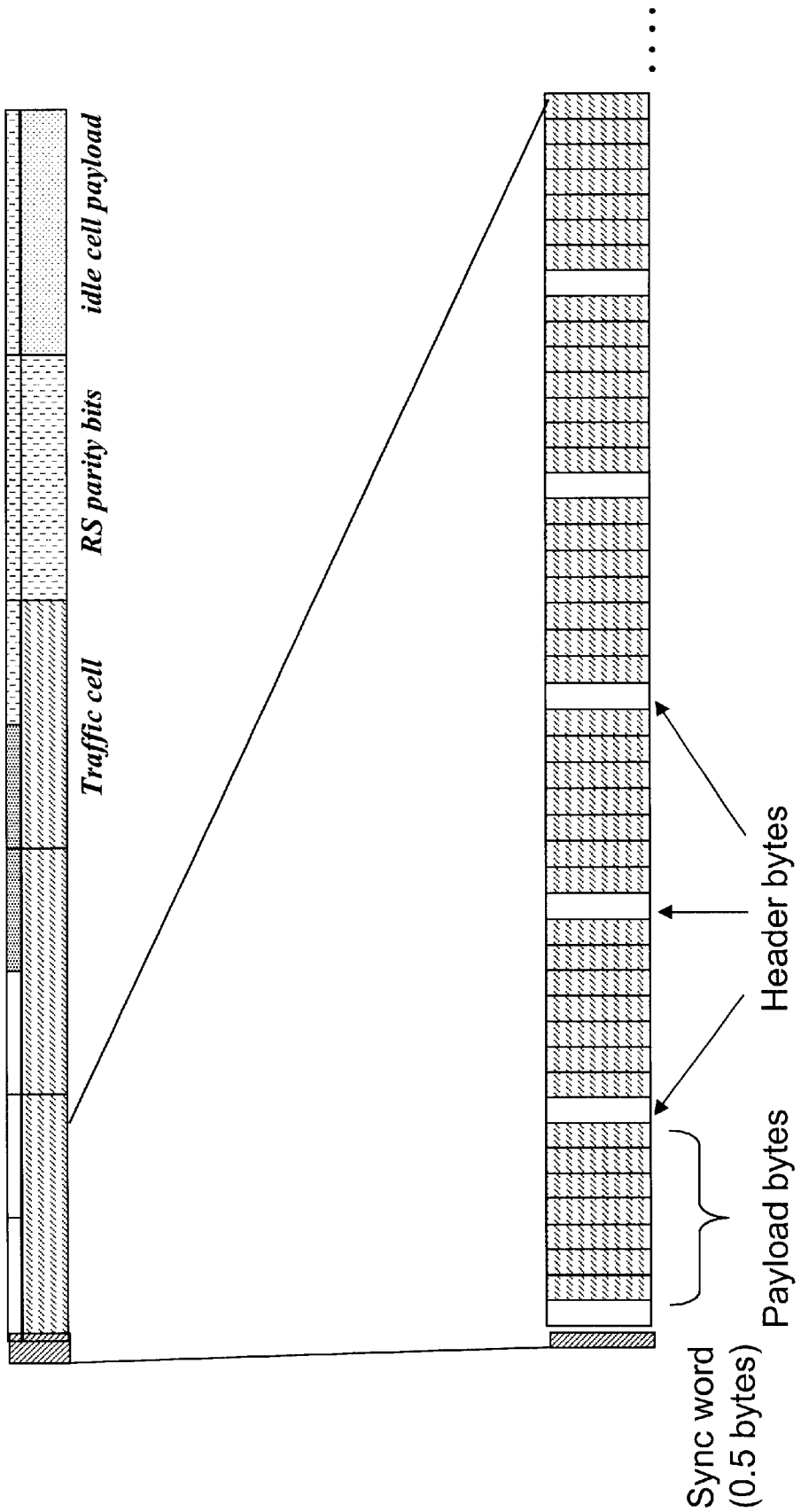
FIG. 4 shows a simplified representation of frame structure.

Referring now to FIG. 4, the combined header field is interleaved across the combined payload field. This may be symbol (e.g. byte) interleaving or bit interleaving, depending on the type of block code used. FIG. 4 shows a simplified frame structure having an interleaved, byte-wise representation Having separately coded the header field and the payload field, the frame is assembled by interleaving the header field with the payload field. The interleaver places one byte of the header frame followed by 7 bytes of the payload frame in a repetitive periodic pattern. Alternative interleaving structures include random arrangement of header and payload bytes. These may suit specific channel conditions and error patterns better. Byte-wise interleaving is chosen to match the symbol size of the Reed-Solomon code used. If other types of code were to be used, with other sizes of symbol, or Reed Solomon codes with other symbol sizes, then the interleaver would typically wok with a comparable symbol size.

Figure 5:
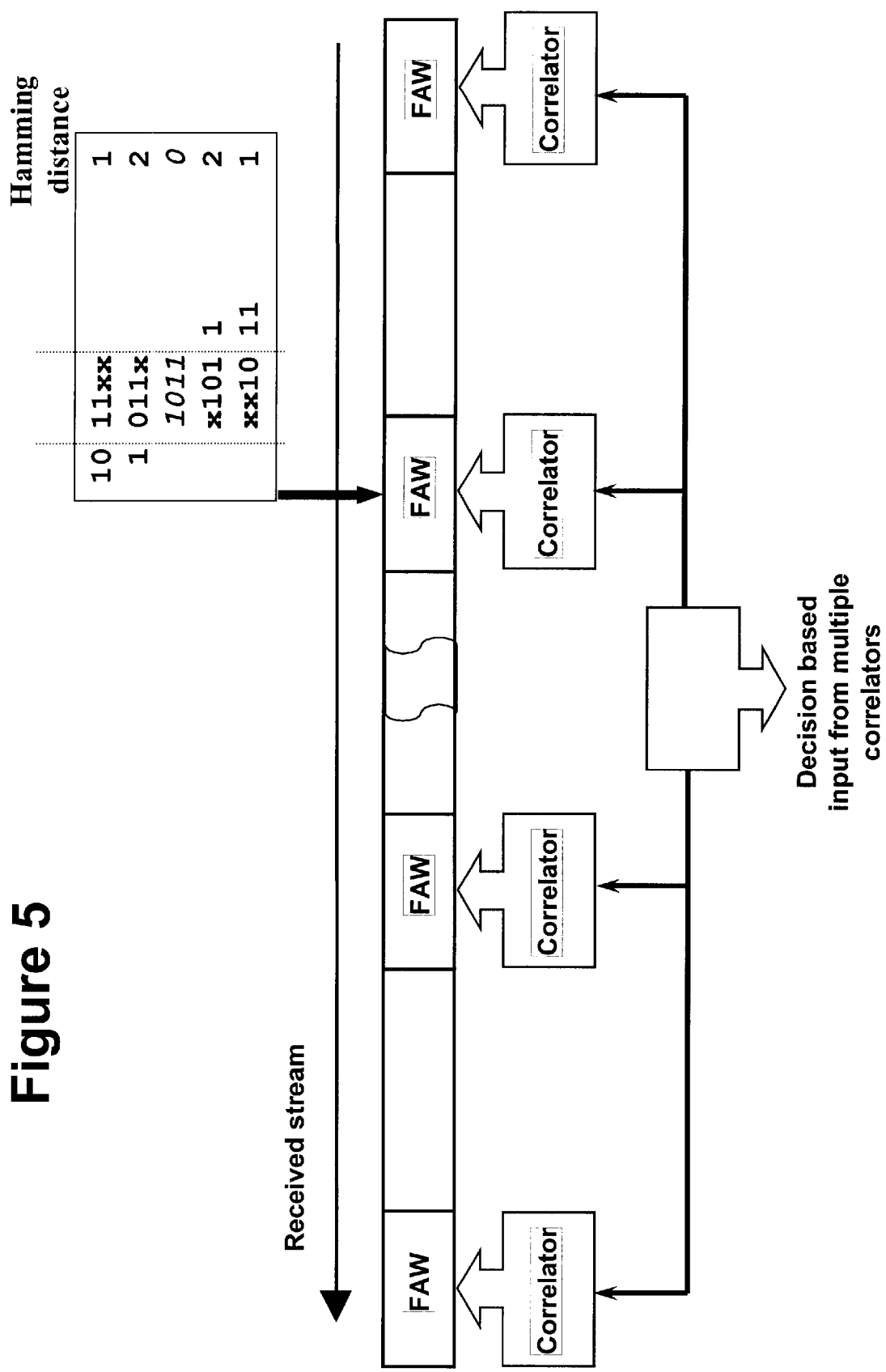
FIG. 5 shows the frame alignment structure.

The Frame Alignment Word (FAW) or synchronisation (sync) structure minimises probability of false match to data. FIG. 5 shows how the FAW/sync structure provides alignment decisions based upon the input from multiple correlators. The provision of a multiple correlator architecture reduces the number of cells lost when false matches occur. In order to allow synchronisation at the frame level, i.e. to enable the beginning of a frame to be found, a synchronisation word is attached to the front of the interleaved header and payload fields. Those skilled in the art will appreciate that it is not necessary for the synchronisation word to be at the front of the frame; indeed, where periodic interference is anticipated, it may be advantageous to vary the position of the synchronisation word in the frame according to some predetermined pattern such that the position varies with time.

Figure 8:
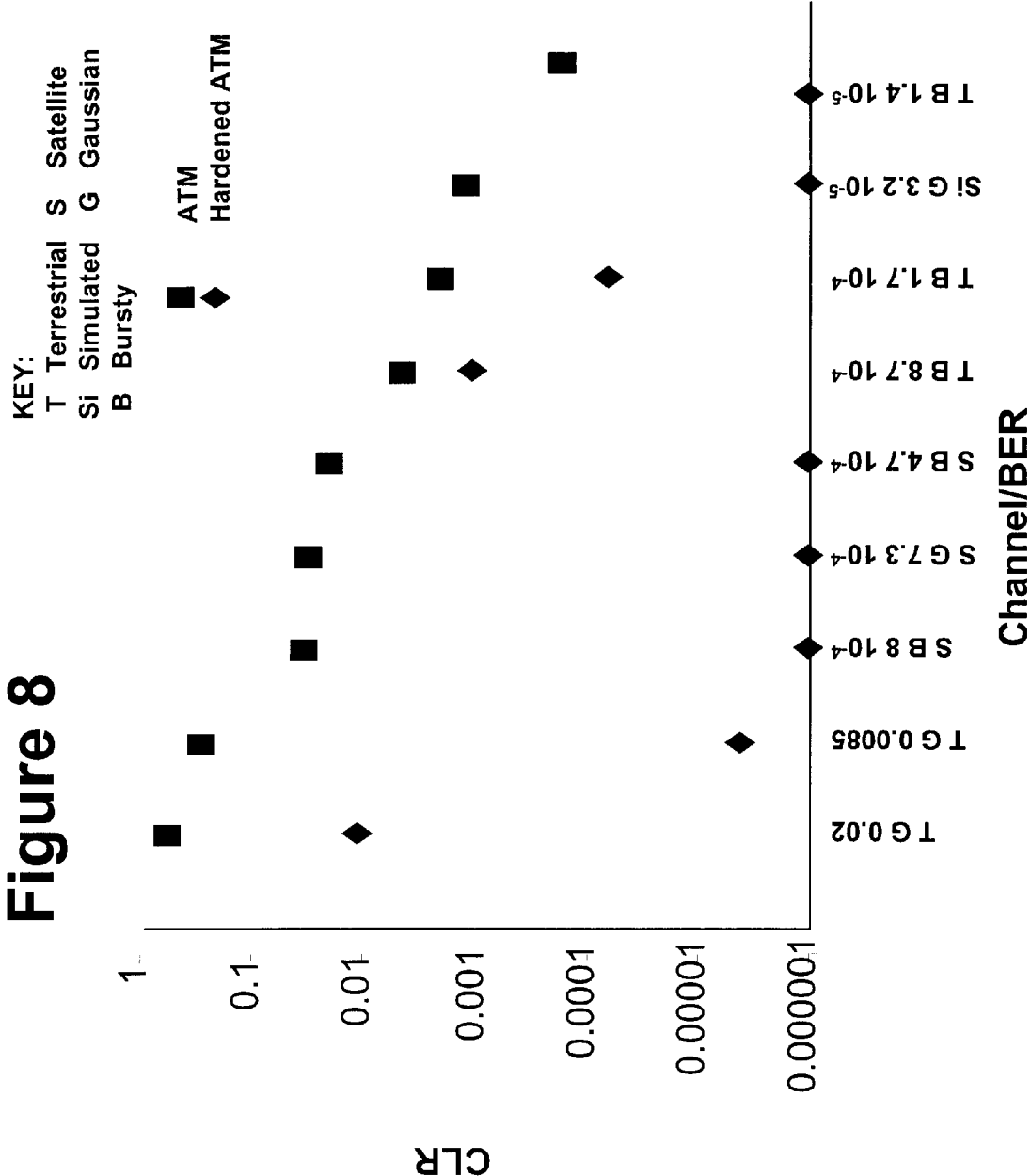
FIGS. 8–10 show graphical comparisons of ATM schemes and ATM schemes in accordance with the invention.
Figure 9:
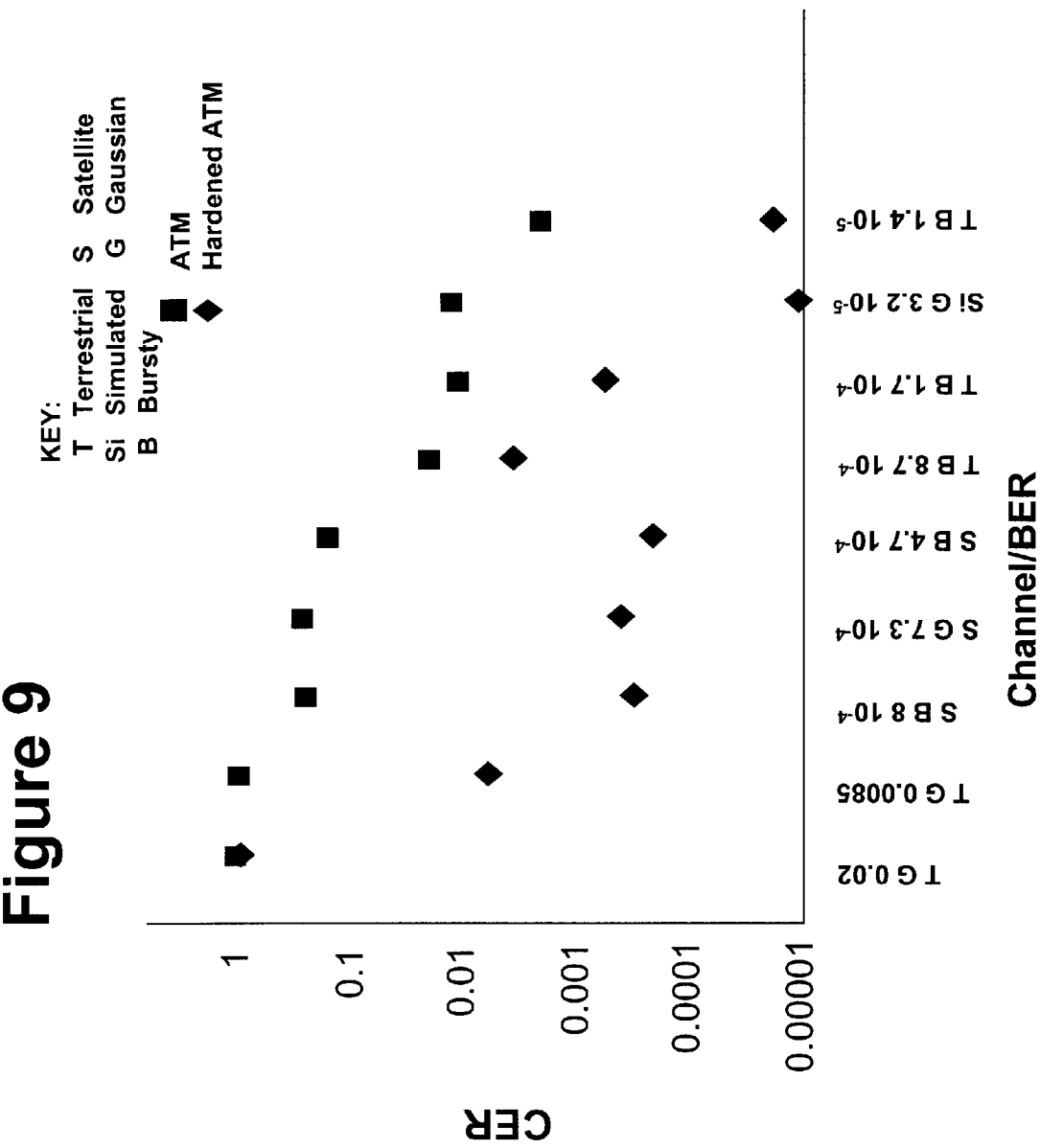
Figure 10:
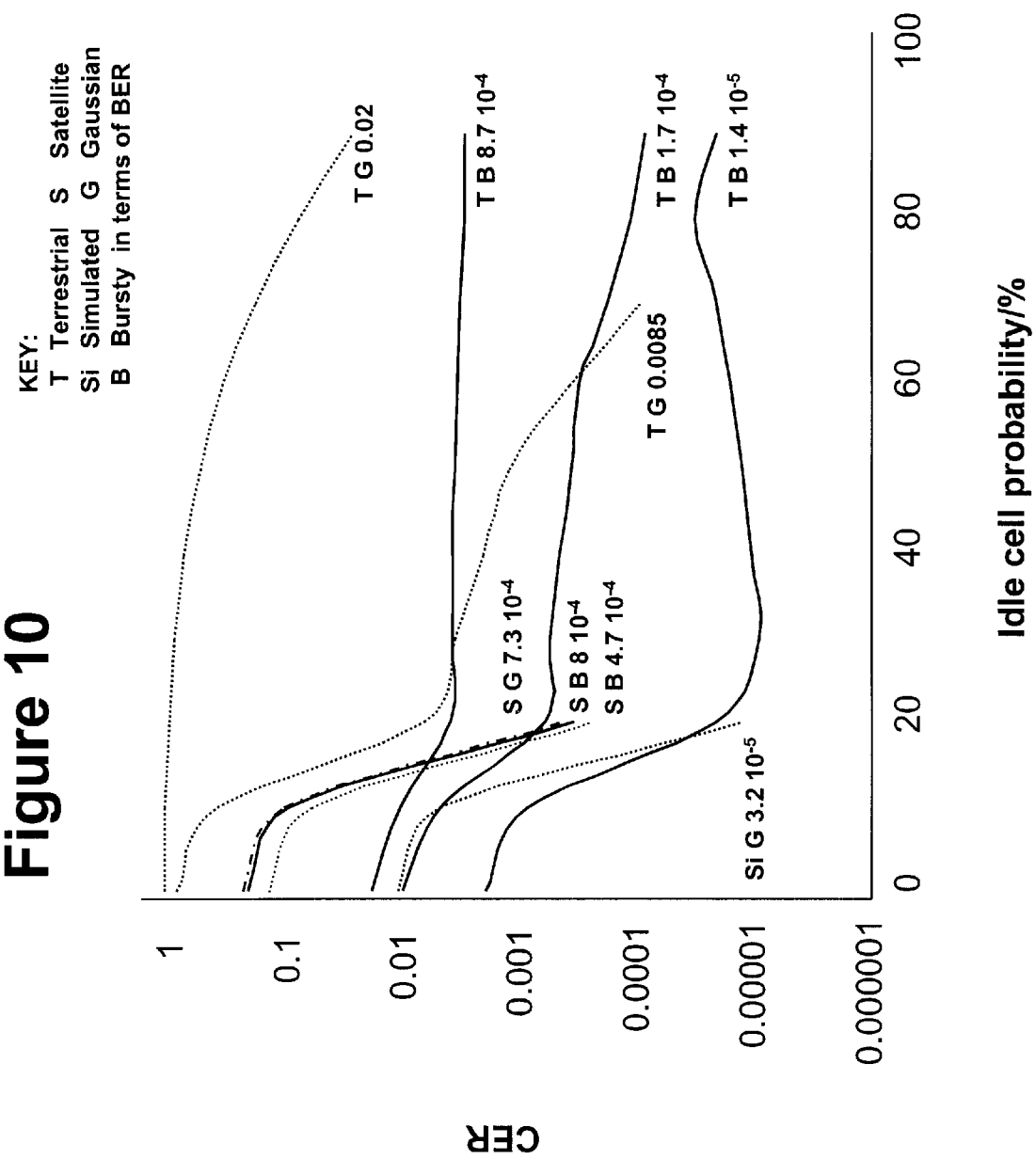

Because radio channels experience high error rates, a small synchronisation word is preferable to a large one because it is less likely to be affected by errors. We have chosen, for the Applicants' simulations, the results of which are shown in FIGS. 8–10, a synchronisation word length of 4 bits, although lengths between about 2 and 10 bits may be equally suitable.

Small synchronisation words can however result in false synchronisation occurring when the synchronisation word is found repeated in the data. To overcome this disadvantage, it is well known for synchronisation algorithms to require detection of several instances of the synchronisabon word at the appropriate intervals before synchronisation is declared. We find that 6 to 8 sequential instances of correct detection are effective for the conditions we have investigated, although some variation may be appropriate for other channel conditions.

The method for choosing the bits making up the synchronisation word is also well known to those skilled in the art. The objective is to minimise the probability that the position of the word could be mistaken if it were to advance or slip by a small number of bits and be compared to randomly chosen data bits. To this end we have chosen 1011 as the synchronisation word, although other sequences may be equally suitable. This word of typically 4 bits per frame is chosen to be more resilient to higher error rates than the original ATM synchronisation scheme based on the HEC field of each cell. The frame is then passed to the radio for transmission.

In order to smooth the variation in rate at which traffic cells arrive, a mechanism is provided whereby the efficiency of the FEC coding is improved. An example of such a mechanism would have a buffer referred hereafter as the active buffer, containing 3 frames (each frame consisting of 5 ATM traffic cells). Another buffer preceding the active buffer would contain the next frame in the sequence to those in the active buffer, this frame is used to give an indication of the incoming traffic rate. From the number of traffic and idle cells present in active buffer, and the number in the preceding buffer, cells can be chosen to make up an output frame with the optimum distribution of traffic and idle cells for the FEC requirements and the traffic loading present. The number of traffic cells to output in each frame is governed by a set of rules depending on the number of traffic cells in both the active and preceding buffers. These rules are set to limit the maximum cell delay variation possible to that set in the ATM standards. An example of these rules is

| Traffic cells in preceding buffer | Traffic cells in active Buffer | Traffic cells in output frame |
|---|---|---|
| >3 | 15 | 5 |
|  | <5 | O/p all traffic cells in active buffer |
|  | 5–14 | 4 |
| <4 | <8 | Nearest integer value of (#traffic cells in active buffer *0.6) |
|  | >7 | 4 |

Figure 6:
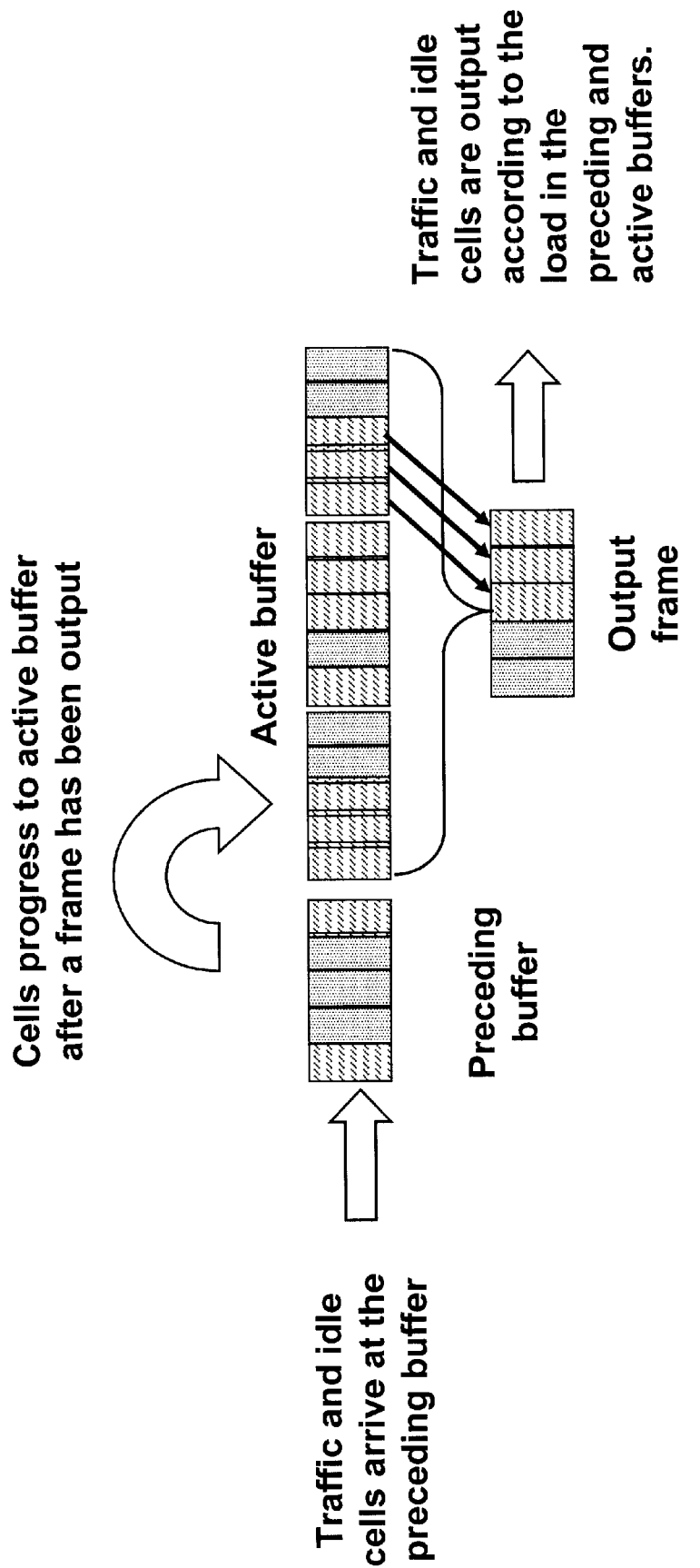
FIG. 6 shows how the idle cells are distributed across the frames.

The process of allocating traffic and idle cells is shown in FIG. 6. The process begins with the arrival of traffic and idle cells at the preceding buffer. Once a frame has been output, the cells progress to an active buffer. Traffic and idle cells are output according to the load in the preceding and active buffers. The overall performance improves with buffer length but active buffer size is limited by CDV. The CDV is specified as 3 ms for class 1 traffic which is approximately equal to 15 cells at 2 Mb/s After reception by the receiving radio, which is assumed to achieve bit synchronisation; frame synchronisation is achieved using the synchronisation word. The synchronisation algorithm is readily derived from information contained in the open literature and is based on examination of several (typically six) synchronisation words simultaneously. The use of a small synchronisation word in this way improves the performance in high error rate environments.

The header and payload fields are then separated for decoding by a de-interleaver. The header field is decoded first so that, as far as possible, errors are corrected using the appended parity bits. The ATM cell headers may then be reconstructed to full-size headers (40 bits) by mapping the shortened address of the modified header onto the appropriate full address and recalculating the HEC. Transmission of the relationship between the compressed and full addresses from the transmitter to the receiver is by means of the signalling bits identified in FIG. 2.

In order to decode the payload field, the presence and location of any idle cells in the header field is determined. If no idle cells are present, then the payload field will not have been coded and no decoding will be required. If a single idle cell is present, based on the interpretation of the header field, then the corresponding payload field will contain parity bits of the block code. The payload field can then be decoded and the payload containing the parity bits can be replaced by a standard idle cell payload. If more than one idle cell is present, then all idle cell payloads are replaced, except for that of the first idle cell, which contains the parity bits of the block code, with standard idle cell payloads. The parity bits in the payload of the first idle cell are then used to decode the payload field, and the payload containing the parity bits is then replaced by a standard idle cell payload. Note that by replacing the idle cell payloads prior to decoding, then any errors in these payloads can be removed and so the error correcting capability of the block code is focused on the remaining traffic cells, thus increasing the effectiveness of the code.

Following the decoding process, the headers and payloads are re-combined and the ATM cells passed on to the next device, typically another ATM switch.

Known techniques, such as that used by the examples of prior methods as discussed above, provide additional protection for the ATM cell header, thus improving the cell loss ratio (CLR), but do not provide protection for the payload. Thus, they are only a partial solution, as payload errors must be corrected at higher layers of the protocol stack, such as the ATM Adaptation Layer (AAL) or higher.

Figure 7:
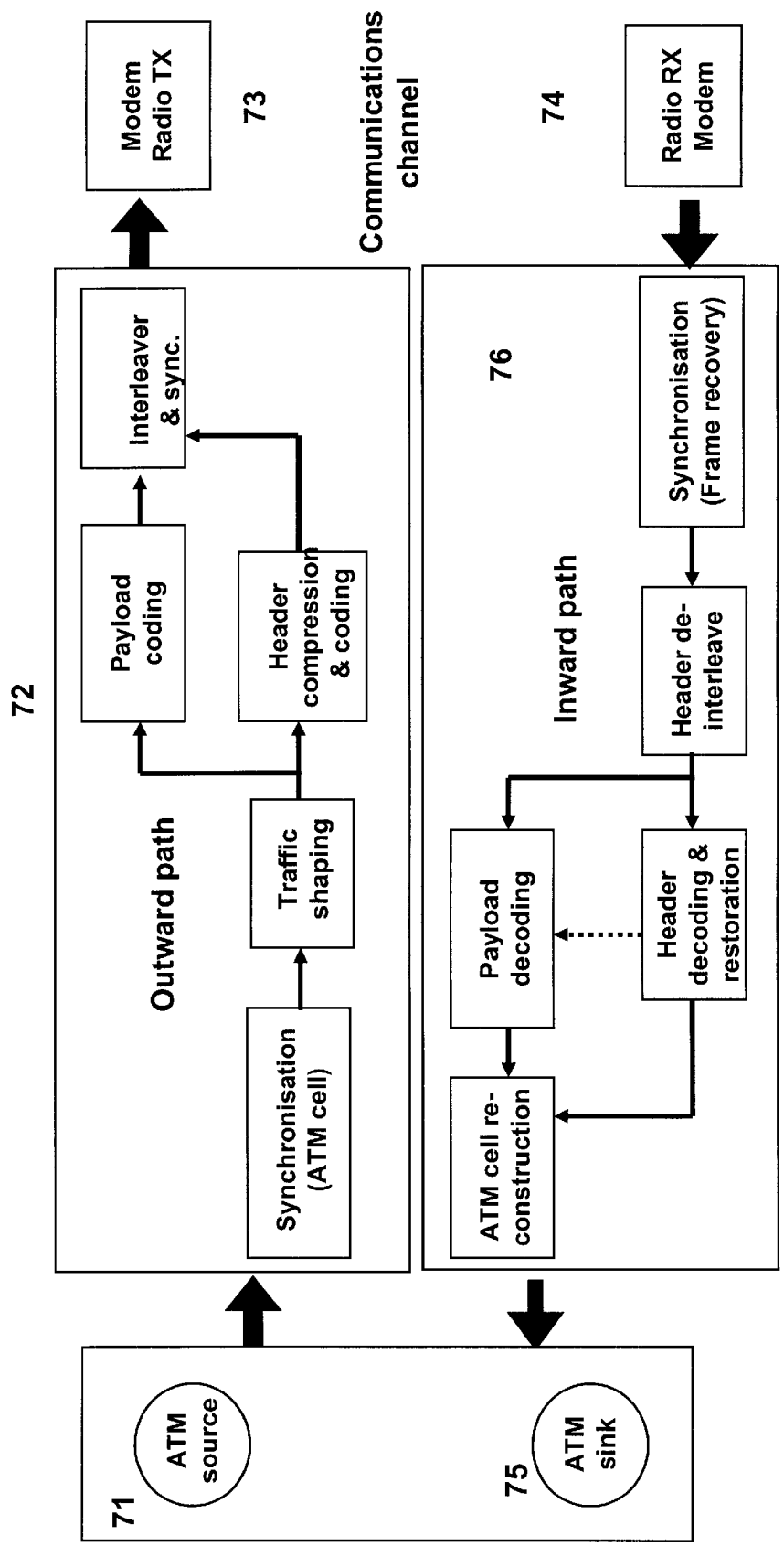
FIG. 7 shows a block diagram of a link enhancer.

Referring to FIG. 7, there is depicted a functional block diagram of a cell based communications transceiver. ATM traffic is switched through switch 71, outward path (transmit) link enhancer 72 to a radio transmit modulator 73. The link enhancer processes the signals to form multi-cell frame signals which are modulated by radio modulator onto the wireless channel. This wireless channel could be, for example, a satellite channel or a fixed wireless channel. The signals from me wireless channel are received at a radio receive demodulator 74 where the radio signals are demodulated and passed to an inward path (receive) link enhancer which reforms the cell based traffic which is passed to switch 75. The link enhancer allows the adaptive selection of a coding scheme from a pre-determined set according to the traffic load and the prevailing radio channel conditions. The link enhancer should be compatible with cell-based protocol switches yet be independent of radio modem design. There should be no bit rate expansion through the link enhancer.

Preferably the link enhancer is implemented through the use of a microprocessor or programmable logic and associated software. The protocol of the present invention is also suitable for hardware implementation, in which case the hardware logic would follow closely the software model shown in FIG. 7. Implementation of this technique for link hardening could for example be by embedding the algorithms in programmable logic arrays such as those available from companies such as Altera. The specific implementation technique is not the subject of this invention and is not thought to be outside the knowledge of those familiar with such devices.

The link enhancer performs several operations: on the outward path the incoming cell based input data, such as ATM data, is synchronised and then grouped into multi-cell frames. Data input circuitry receives such multi-cell frames and with the microprocessor and memory identifies and re-distributes idle cells across several frames as discussed above. The data is separated into payload fields and header fields.

The headers of the cells are then compressed to reduce the address field and block coded by the microprocessor, with buffer memory assisting in interleaving the header field across the combined payload field. The interleaving of the header field helps to reduce the impact of burst errors on the header field.

For the reception of signals, the receive link enhancer receives signals from radio demodulator 74, performs frame synchronization, de-interleaves the header and converts the multi-cell frames into the original single cell frames. After the de-interleaving of the multi-cell frames, the payload is decoded employing header decoding data. Error correction routines are performed as necessary as the idle cells are recreated as the data is re-formatted into the single-cell data protocol.

One aspect of the invention relates to the use of idle cells as a means of coding the payload field. Ideally therefore one or more idle cells should be present in each frame. As idle cells are not in general uniformly distributed, a long frame would offer an improved probability of including an idle cell. Furthermore it is well known to those skilled in the art that coding efficiency improves with the size of the coded block i.e. more errors can be corrected for a given overhead in a large block than in a small block. This again pushes us in the direction of large frame sizes.

Another aspect of the invention is an algorithm which redistributes the idle cells so as to improve the uniformity of their distribution. However, this algorithm is constrained by the limits imposed by the ATM standards for cell delay variation, which prevent cells being moved over indefinite distances in the cell stream. Therefore frames of greater length then the allowed cell delay variation are of no benefit in improving the uniformity of the idle cell distribution and hence the effectiveness of the payload coding. Secondly, the complexity of implementing error correction coding, and in particular decoding, increases with block length. It therefore becomes increasingly onerous to realise a practical implementation of error correction coding for large payload and header fields. These considerations therefore push us in the direction of smaller frame sizes.

The frame size chosen for simulation was based on a compromise between the above listed driving forces and is 271.5 bytes, having a header field of 31 bytes, a payload field of 240 bytes and a 0.5 byte synchronisation word. However, it will be appreciated by those skilled in the art that this is not a unique solution, that the principles may be adapted to suit other channel conditions, and that the optimum solution may be expected to vary as signal processing technology improves.

A radio channel for applications such as satellite links is characterised by random errors due to, for example, thermal noise in the receiver, fading of the signal and interference from other sources. When combined with the characteristics of the radio receiver this may result in a random series of bit errors or the errors may be grouped in bursts. Typical error rates vary between 1 error in 1000 bits and 1 error in 100,000 bits following reception and processing in the receiver. In burst conditions, the instantaneous error rate can be relatively high followed by longer periods between bursts where very few errors occur.

FIGS. 8, 9 and 10 show the results of actual data and simulated data comprising the actual results which have been processed in accordance with the invention. The actual data is determined from Terrestrial and Satellite links. A further Gaussian link was simulated, with the process in accordance with the present invention also being applied.

FIG. 8 shows a variation in cell loss ratio compared with the bit error rate of various channels, selected from actual Terrestrial and Satellite links and one simulated link. It is clearly apparent that there is a significant logarithmic reduction in the cell loss ratio when the teaching of the present invention is applied to a wireless link.

FIG. 9 shows a variation in cell error rate (CER is defined in the ATM standards and relates to the proportion of payloads with errors) compared with inferior rate for the same channels as reviewed in FIG. 8. For low bit error rates <0.02 there is seen a significant improvement when the teaching of the present invention is applied. The figure shows performance improvement in cell error ratio for ATM for an idle cell probability of 20% and for various different channels; some satellite, some terrestrial, some experimental and some simulated. The performance improvement is significant and depends on channel type e.g. Gaussian or bursty etc. Channels are ranked in order of decreasing BER on the x-axis.

FIG. 10 shows a performance improvement in cell error ratio for ATM as a function of idle cell probability and for various different channels; some satellite, some terrestrial, some experimental and some simulated in accordance with the teaching of the present invention.

The effect of this protocol when implemented in a communications system is expected to be a reduction in both the cell loss ratio (CLR) and the cell error ratio (CER) and hence a reduction in the amount of retransmitted data. The exact improvement will depend on the error characteristics of the channel but simulation results suggest improvements of approximately 3 orders of magnitude in both CLR and CER are possible in both terrestrial point-to-point links and ground-to-satellite links.

Link accelerators are necessary to support ATM on existing and proposed satellite links and terrestrial access radio links. By reducing the error rate, they reduce re-transmissions by higher layer protocols such as TCP/IP, which can provide a significant saving in bandwidth, as such protocols tend to have relatively large frames sizes. The application may therefore be in radio products such as the REUNION (Trade Mark of Nortel Networks Corporation) type of broadband access radio, satellite radio links, or in the ATM switch itself, providing a "radio-enabled" port. Finally, the technique is potentially extendable to the IP protocol, where it's avoidance of link-layer ARQ makes it of particular interest for real-time, delay-sensitive traffic.

What is claimed is:

1. A method of providing error correction for a cell based transmission protocol:

wherein cells are arranged to form multi-cell frames;
wherein each multi-cell frame has a header field which comprises all the headers of the cells within the multi-cell frame and wherein each multi-cell frame has a payload field which comprises all the payloads of the cells within the multi-cell frame; wherein the header field of the multi-cell frame and payload field of the multi-cell frame are coded separately; and
wherein idle cells within the payload of the multi-cell frame provide space for error correction of the payload field.

2. A method according to claim 1 wherein the header field of each cell is reduced in size.

3. A method according to claim 1 wherein the header field is used to optimise payload coding.

4. A method according to claim 1 wherein, for a plurality of multi-cell frames, the idle cells are evenly distributed across said plurality of multi-cell frames.

5. A method according to claim 1 wherein the cell-based protocol is the ATM protocol.

6. A method according to claim 1 wherein, for a plurality of multi-cell frames, the number of idle cells are allocated according to the steps;
   i) determining the number N of multi-cell frames;
   ii) determining the number N of idle cells within said N multi-cell frames, and;
   iii) allocating the first N idle cells to the N multi-cell frames such that each frame contains an idle cell.

7. A method according to claim 1 wherein a link for the multi-cell frames is a satellite link.

8. A method according to claim 1 wherein a link for the multi-cell frames is a terrestrial link.

9. A method according to claim 1 wherein, for a plurality of multi-cell frames, the idle cells are evenly distributed across said plurality of multi-cell frames and wherein buffers are employed to evenly distribute the idle cells.

10. A method according to claim 1 wherein, for a plurality of multi-cell frames, the idle cells are evenly distributed across said plurality of multi-cell frames and wherein a preceding buffer and an active buffer are used to evenly distribute the idle cells.

11. A method according to claim 1 including an active buffer and a preceding passive buffer, each buffer containing a number of cells, and wherein the number of cells to output in each frame is governed by a set of rules depending on the number of cells in both the active and preceding buffers.

12. A method according to claim 11 wherein the set of rules are set to limit the maximum cell delay variation possible to that set in the cell based protocol standards.

13. A method according to claim 11 wherein the set of rules are set to limit the maximum cell delay variation possible to that set in the cell based protocol standards according to the following table:

| Traffic cells in preceding buffer | Traffic cells in active Buffer | Traffic cells in output frame |
|---|---|---|
| >3 | 15 | 5 |
|  | <5 | O/p all traffic cells in active buffer |
|  | 5–14 | 4 |
| <4 | <8 | Nearest integer value of (#traffic cells in active buffer *0.6) |
|  | >7 | 4 |

14. A system for transmitting data across a link in accordance with a cell based protocol and comprising a link enhancer, the link enhancer being positioned for transmission between a cell based protocol switch and a channel modulator; and, for reception, between a channel modulator a cell-based protocol switch, the link enhancer being operable to:
   i) arrange cells into multi-cell frames;
   ii) arrange a header field of each multi-cell frame such that the header field comprises all the headers of the cells within the multi-cell frame and arrange a payload field of each multi-cell frame such that the payload field comprises all the payloads of the cells within the multi-cell frame;
   iii) code separately the header field of the multi-cell frame and payload field of the multi-cell frame; and
   iv) provide space for error correction in idle cells, whereby to optimise code performance using the idle cells.

15. A system according to claim 14 wherein the header field of each cell is reduced in size.

16. A system according to claim 14 wherein the header field is used to optimise payload coding.

17. A system according to claim 14 wherein, for a plurality of multi-cell frames, the idle cells are evenly distributed across said plurality of multi-cell frames.

18. A system according to claim 14 wherein the cell-based protocol is the ATM protocol.

19. A system according to claim 14 wherein, for a plurality of multi-cell frames, the number of idle cells are allocated according to the steps;
   i) determining the number N of multi-cell frames;
   ii) determining the number N of idle cells within said N multi-cell frames, and;
   iii) allocating the first N idle cells to the N multi-cell frames such that each frame contains an idle cell.

20. A system according to claim 14, wherein the link is a satellite link.

21. A system according to claim 14, wherein the link is a terrestrial link.

22. A method according to claim 14 wherein, for a plurality of multi-cell frames, the idle cells are evenly distributed across said plurality of multi-cell frames and wherein buffers are employed to evenly distribute the idle cells.

23. A system according to claim 14 wherein, for a plurality of multi-cell frames, the idle cells are evenly distributed across said plurality of multi-cell frames and wherein a preceding buffer and an active buffer are used to evenly distribute the idle cells.

24. A system according to claim 14 wherein, for a plurality of multi-cell frames, the idle cells are evenly distributed across said plurality of multi-cell frames and wherein a preceding buffer and an active buffer are used to evenly distribute the idle cells, wherein the number of cells output in each frame is governed by a set of rules depending on the number of cells in both the active and preceding buffers.

25. A system according to claim 24 wherein the set of rules are set to limit the maximum cell delay variation possible to that set in the cell based protocol standards.

26. A system according to claim 24 wherein the set of rules are set to limit the maximum cell delay variation possible to that set in the cell based protocol standards according to the following table:

| Traffic cells in preceding buffer | Traffic cells in active Buffer | Traffic cells in output frame |
|---|---|---|
| >3 | 15 | 5 |
|  | <5 | O/p all traffic cells in active buffer |
|  | 5–14 | 4 |
| <4 | <8 | Nearest integer value of (#traffic cells in active buffer *0.6) |
|  | >7 | 4 |

27. An apparatus for transmitting data across a link in accordance with a cell based protocol and comprising a link enhancer, the link enhancer being positioned for transmission between a cell based protocol switch and a channel modulator; and, for reception, between a channel modulator a cell-based protocol switch, the link enhancer being operable to:

i) arrange cells into multi-cell frames;

ii) arrange a header field of each multi-cell frame such that the header field comprises all the headers of the cells within the multi-cell frame and arrange a payload field of each multi-cell frame such that the payload field comprises all the payloads of the cells within the multi-cell frame;

iii) code separately the header field of the multi-cell frame and payload field of the multi-cell frame, and;

iv) provide space for error correction in idle cells, whereby to optimise code performance using the idle cells.

28. An apparatus according to claim 27 wherein the header field of each cell is reduced in size.

29. An apparatus according to claim 27 wherein the header field is used to optimise payload coding.

30. An apparatus according to claim 27 wherein, for a plurality of multi-cell frames, the idle cells are evenly distributed across said plurality of multi-cell frames.

31. An apparatus according to claim 27 wherein the cell-based protocol is the ATM protocol.

32. An apparatus according to claim 27 wherein, for a plurality of multi-cell frames, the number of idle cells are allocated according to the steps;

i) determining the number N of multi-cell frames;

ii) determining the number N of idle cells within said N multi-cell frames, and;

iii) allocating the first N idle cells to the N multi-cell frames such that each frame contains an idle cell.

33. An apparatus according to claim 27, wherein the link is a satellite link.

34. An apparatus according to claim 27, wherein the link is a terrestrial link.

35. A method according to claim 27, wherein, for a plurality of multi-cell frames, the idle cells are evenly distributed across said plurality of multi-cell frames and wherein buffers are employed to evenly distribute the idle cells.

36. An apparatus according to claim 27, wherein, for a plurality of multi-cell frames, the idle cells are evenly distributed across said plurality of multi-cell frames and wherein a preceding buffer and an active buffer are used to evenly distribute the idle cells.

37. An apparatus according to claim 27, wherein, for a plurality of multi-cell frames, the idle cells are evenly distributed across said plurality of multi-cell frames and wherein a preceding buffer and an active buffer are used to evenly distribute the idle cells, and wherein the number of cells output in each frame is governed by a set of rules depending on the number of cells in both the active and preceding buffers.

38. An apparatus according to claim 37, wherein the set of rules are set to limit the maximum cell delay variation possible to that set in the cell based protocol standards.

39. An apparatus according to claim 37, wherein the set of rules are set to limit the maximum cell delay variation possible to that set in the cell based protocol standards according to the following table:

| Traffic cells in preceding buffer | Traffic cells in active Buffer | Traffic cells in output frame |
|---|---|---|
| <3 | 15 | 5 |
|  | <5 | O/p all traffic cells in active buffer |
|  | 5–14 | 4 |
| <4 | <8 | Nearest integer value of (#traffic cells in active buffer *0.6) |
|  | >7 | 4 |

40. An apparatus for a receiver for receiving across a link in accordance with a cell based protocol and comprising a link enhancer, the link enhancer being positioned for transmission between a cell based protocol switch and a channel modulator; and, for reception, between a channel modulator a cell-based protocol switch, the link enhancer being operable to:

i) receive multi-cell frames;

ii) arrange a header field of each multi-cell frame such that the header field comprises all the headers of the cells within the multi-cell frame and arrange a payload field of each multi-cell frame such that the payload field comprises all the payloads of the cells within the multi-cell frame;

iii) decode separately the header field of the multi-cell frame and payload field of the multi-cell frame;

iv) analyse the received data for errors using error correction coding from error correction data encoded within idle cells; and v) convert the signals to a cell based protocol, the error correction coding allowing reduced errors whereby to optimise code performance using the idle cells.

41. An apparatus according to claim 40 wherein the cell-based protocol is the ATM protocol.

42. An apparatus according to claim 40, wherein the link is a satellite link.

43. An apparatus according to claim 40, wherein the link is a terrestrial link.

44. A method according to claim 40 wherein, for a plurality of multi-cell frames, the idle cells are evenly distributed across said plurality of multi-cell frames and wherein buffers are employed to evenly distribute the idle cells.

45. An apparatus according to claim 40 wherein, for a plurality of multi-cell frames, the idle cells are evenly distributed across said plurality of multi-cell frames and wherein a preceding buffer and an active buffer are used to evenly distribute the idle cells.

* * * * *